US012682311B2

(12) United States Patent
Shimozawa et al.

(10) Patent No.: US 12,682,311 B2
(45) Date of Patent: Jul. 14, 2026

(54) CARGO HANDLING SYSTEM, CONTROL METHOD FOR OPERATING CARGO HANDLING SYSTEM, NON-TRANSITORY COMPUTER-READABLE RECORDING MEDIUM STORING CONTROL PROGRAM FOR OPERATING CARGO HANDLING SYSTEM

(71) Applicant: Isuzu Motors Limited, Yokohama (JP)

(72) Inventors: Tomoaki Shimozawa, Fujisawa (JP);
Maya Matsushita, Fujisawa (JP); Yuka Mizushi, Fujisawa (JP); Atsushi Shitanaka, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 4 days.

(21) Appl. No.: 18/823,765

(22) Filed: Sep. 4, 2024

(65) Prior Publication Data

US 2025/0086572 A1 Mar. 13, 2025

(30) Foreign Application Priority Data

Sep. 8, 2023 (JP) .................................. 2023-146135

(51) Int. Cl.
G06Q 10/0833 (2023.01)
G06K 19/07 (2006.01)
(Continued)

(52) U.S. Cl.
CPC ..... G06Q 10/0833 (2013.01); G06K 19/0723 (2013.01); G06K 19/07705 (2013.01); H04B 17/318 (2015.01)

(58) Field of Classification Search
CPC ........... G06Q 10/0833; G06K 19/0723; G06K 19/07705; H04B 17/318
See application file for complete search history.

(56) References Cited

U.S. PATENT DOCUMENTS 6,988,079 B1 * 1/2006 Or-Bach .............. G06Q 20/203
709/224
9,740,897 B1 * 8/2017 Salour ................ G06K 7/10079
(Continued)

FOREIGN PATENT DOCUMENTS

JP 09-102765 4/1997
JP 2001-034878 2/2001
(Continued)

OTHER PUBLICATIONS

Tai Tiong Eng, ( Dec. 25, 2022). Application of RFID Sensors for Logistics Technologies , <Application of RFID Sensors for Logistics Technologies—SIPMM Publications>. (Year: 2022).*

*Primary Examiner* — Shannon S Campbell
*Assistant Examiner* — Manal A. Alsamiri

(57) ABSTRACT

Provided is a cargo handling system that supports, when unloading of a cargo loaded on a vehicle is performed, work of the unloading, and includes: an RFID reader/writer that transmits and receives a radio wave to and from an RFID tag attached to the cargo; a storage section that stores a list in which ID information of the RFID tag is associated with a delivery location; a display apparatus disposed in the cargo compartment; and a control apparatus that acquires the ID information associated with the delivery location, further acquires a radio wave intensity of the RFID tag having the acquired ID information from the RFID reader/writer, and controls, in a case where the acquired radio wave intensity exceeds a threshold value, the display apparatus such that the display apparatus indicates a placement location for an undelivered cargo, which is a cargo to which the RFID tag is attached.

7 Claims, 5 Drawing Sheets

(51) Int. Cl.
  *G06K 19/077* (2006.01)
  *H04B 17/318* (2015.01)

(56) References Cited

U.S. PATENT DOCUMENTS

| | | | |
|---|---|---|---|
| 11,416,805 B1 | 8/2022 | Pietrowski et al. | |
| 2004/0069850 A1* | 4/2004 | De Wilde | G06K 19/07758 |
| | | | 235/385 |
| 2008/0278324 A1 | 11/2008 | Uchimura et al. | |
| 2012/0262287 A1* | 10/2012 | Imam | E05B 81/66 |
| | | | 340/457 |
| 2017/0140329 A1* | 5/2017 | Bernhardt | B65G 1/1371 |
| 2022/0292443 A1* | 9/2022 | Matsuura | G06Q 30/06 |
| 2023/0222435 A1* | 7/2023 | Hill | G06T 7/586 |
| | | | 705/333 |
| 2024/0220745 A1* | 7/2024 | Bonafe | G06K 7/10099 |

FOREIGN PATENT DOCUMENTS

| | | |
|---|---|---|
| JP | 2002-207079 | 7/2002 |
| JP | 2013-043736 | 3/2013 |
| JP | 2013-170082 | 9/2013 |
| JP | 2019-008678 | 1/2019 |
| JP | 2020-073409 | 5/2020 |
| JP | 2020-142891 | 9/2020 |
| JP | 2020-203753 | 12/2020 |
| JP | 2021-011328 | 2/2021 |
| JP | 2021-075364 | 5/2021 |
| JP | 2021-157574 | 10/2021 |
| JP | 2022-107241 | 7/2022 |
| JP | 2022-149695 | 10/2022 |
| JP | 7240038 | 3/2023 |
| WO | WO 2006/001237 | 1/2006 |
| WO | WO 2019/186883 | 12/2020 |

* cited by examiner

| ID INFORMATION | DELIVERY LOCATION | ...... | ...... |
|---|---|---|---|
| AAAAAA | XXX | ...... | ...... |
| BBBBBB | YYY | ...... | ...... |
| CCCCCC | ZZZ | ...... | ...... |
| ...... | ...... | ...... | ...... |
| ...... | ...... | ...... | ...... |
| ...... | ...... | ...... | ...... |

FIG. 3

CARGO HANDLING SYSTEM, CONTROL METHOD FOR OPERATING CARGO HANDLING SYSTEM, NON-TRANSITORY COMPUTER-READABLE RECORDING MEDIUM STORING CONTROL PROGRAM FOR OPERATING CARGO HANDLING SYSTEM

CROSS REFERENCE TO RELATED APPLICATIONS

This application is a Paris Convention which claims the benefit of Japanese Patent Application No. 2023-146135 filed on Sep. 8, 2023. The contents of the above application is all incorporated by reference as if fully set forth herein in its entirety

TECHNICAL FIELD

The present invention relates to a cargo handling system.

BACKGROUND ART

In conventional delivery, the driver loads a cargo, memorizes the vehicle's delivery location and the cargo's loading location, and finds the cargo in the cargo compartment based on devising of the loading order or the driver's memory to deliver the cargo.

For example, Japanese Patent Publication Laid-Open No. 2013-170082 (hereinafter, referred to as Patent Literature 1) discloses a delivery destination monitoring system for cargo, which makes it possible to understand, at a remote location from a vehicle, that the delivery of cargos has been properly performed, without the need to individually manage the loading and unloading of a cargo compartment of the vehicle for each cargo by attaching an IC tag to each cargo in the cargo compartment of the vehicle.

SUMMARY OF INVENTION

Technical Problem

Incidentally, the driver relies on loading skills and memory to find a cargo in the cargo compartment, and thus, the discovery of the cargo is not necessarily efficient. For this reason, it takes time to train a delivery driver with sufficient skills, and the work is difficult for beginners.

Further, in a case where the person who unloads a cargo is not the same person who loads the cargo, it becomes very difficult to find the cargo. For this reason, there is a problem in that it is not possible to divide the loading work and the unloading work, and that the burden is concentrated on, for example, the driver in a case where the driver performs both the loading work and the unloading work.

Further, in the system described in Patent Literature 1, a cargo at a delivery destination is monitored based on an IC tag, and thus, an effect that a cargo in the cargo compartment can be surely delivered is achieved. However, there is a problem in that it is not possible to reduce the burden on the driver.

An object of the present disclosure is to provide a cargo handling system capable of increasing the efficiency of delivery work by reducing the burden on a worker.

Solution to Problem

In order to achieve the above object, the cargo handling system according to the present disclosure supports, when unloading of a cargo loaded on a vehicle is performed, work of the unloading. The cargo handling system includes: an RFID reader/writer that includes a plurality of antennas disposed in a cargo compartment, and transmits and receives a radio wave to and from an RFID tag the cargo through each of the plurality of antennas, the RFID tag being attached to the cargo; a storage section that stores a list in which ID information of the RFID tag is associated with a delivery location; a display apparatus disposed in the cargo compartment; and a control apparatus that acquires the ID information associated with the delivery location from the storage section, further acquires a radio wave intensity of the RFID tag from the RFID reader/writer, and controls, in a case where the radio wave intensity that has been acquired exceeds a threshold value, the display apparatus such that the display apparatus indicates a placement location for an undelivered cargo, the RFID tag having the ID information that has been acquired, the undelivered cargo being a cargo to which the RFID tag is attached.

Advantageous Effects of Invention

According to the present disclosure, it is possible to increase the efficiency of delivery work by reducing the burden on a worker.

BRIEF DESCRIPTION OF DRAWINGS

FIG. 3 illustrates an example of a list in which ID information of RFID tags is associated with delivery locations;

DESCRIPTION OF EMBODIMENTS

Hereinafter, an embodiment of the present disclosure will be described with reference to the accompanying drawings.

Figure 1:
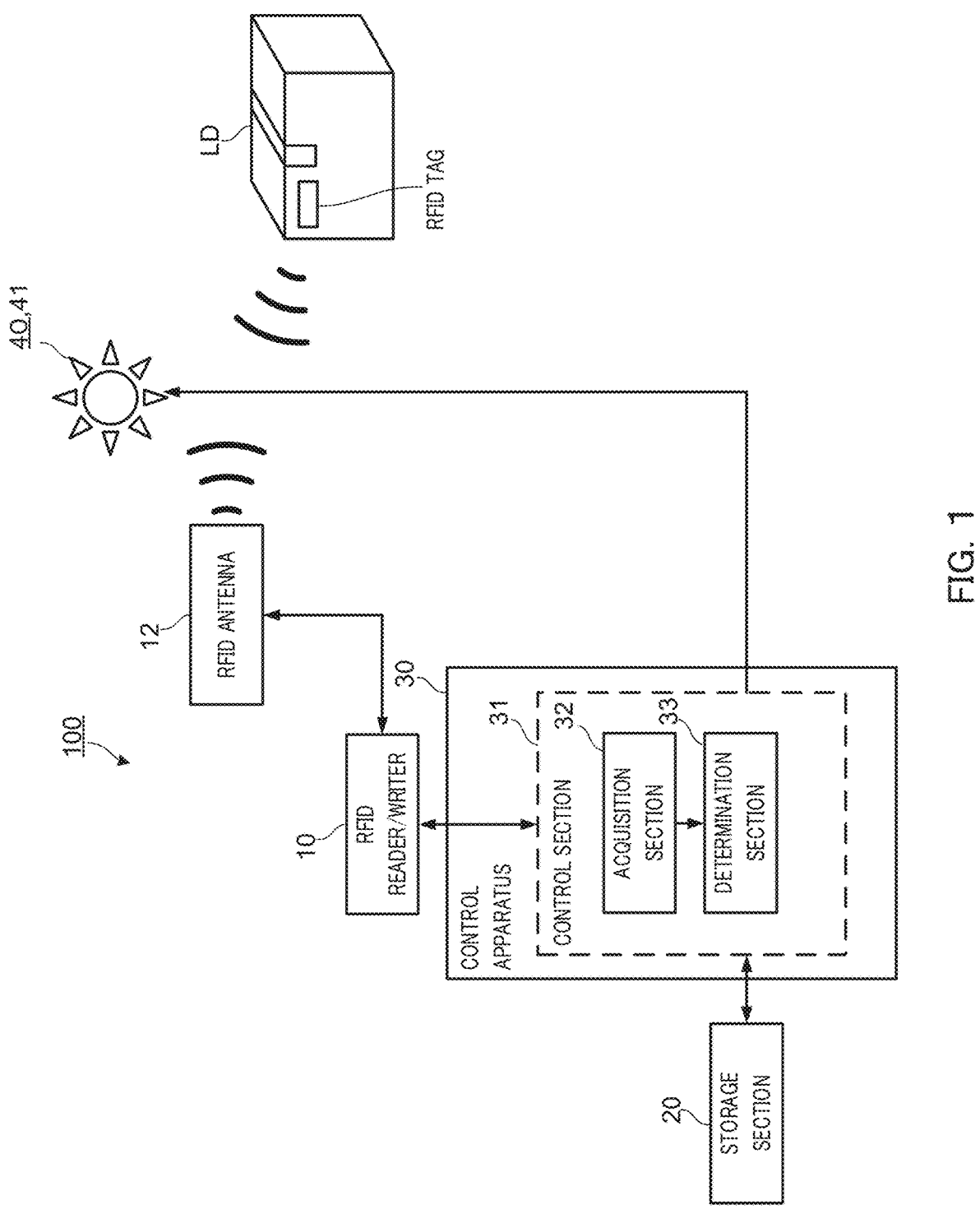
FIG. 1 is a functional block diagram functionally illustrating a cargo handling system in an embodiment of the present disclosure.

FIG. 1 is a functional block diagram functionally illustrating a cargo handling system in an embodiment of the present disclosure. In FIG. 1, the arrows indicate main data flows, and there may be data flows not illustrated in FIG. 1. In FIG. 1, each function block represents a configuration in units of functions, not in units of hardware (apparatuses). The functional blocks illustrated in FIG. 1 may therefore be implemented within a single apparatus or distributed and implemented across a plurality of apparatuses. The data exchange between the function blocks may be performed through any means such as a data bus, a communication network, or the like.

Figure 2:
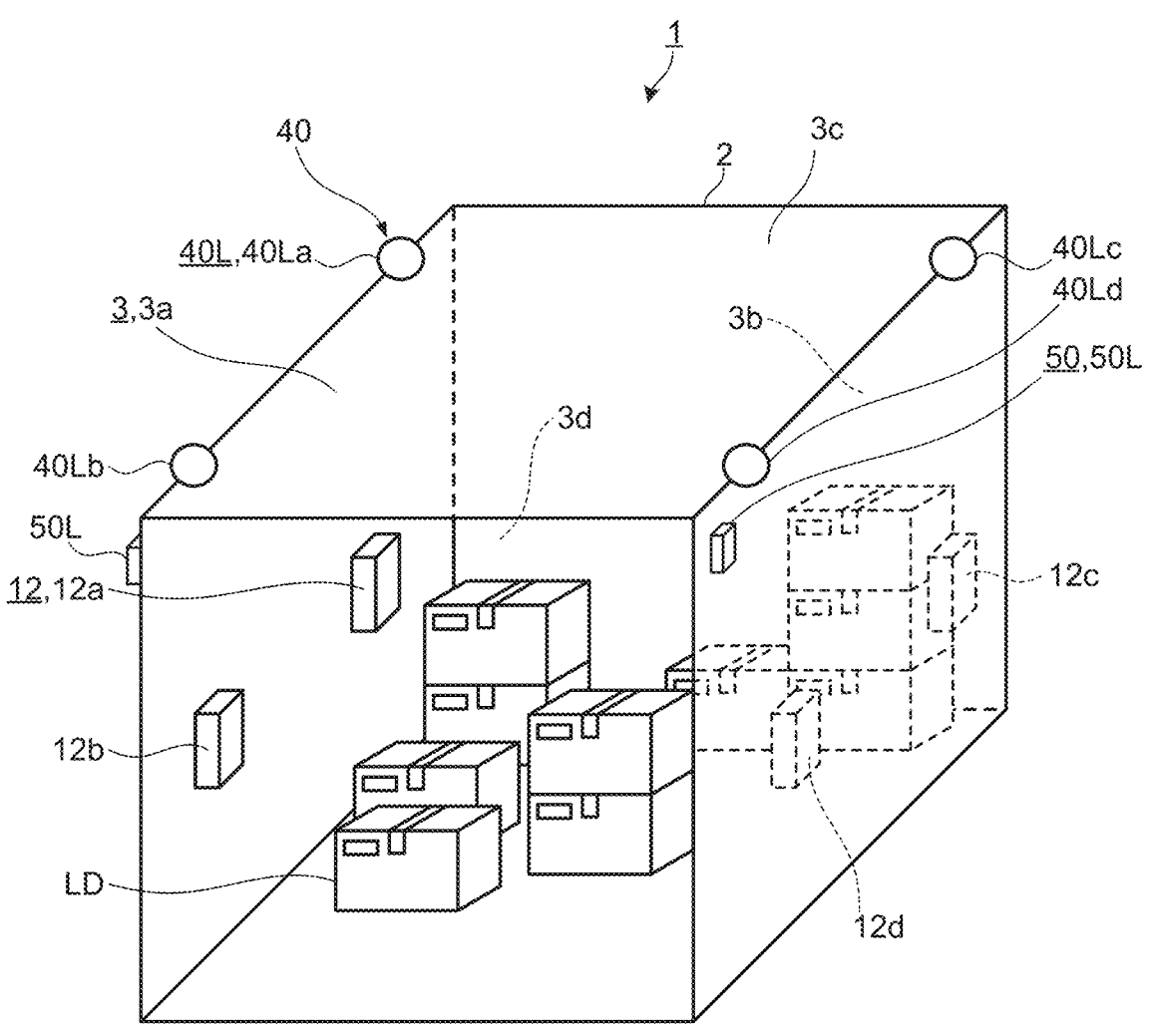
FIG. 2 schematically illustrates a cargo compartment of a vehicle in the embodiment of the present disclosure, viewed from the right rear obliquely above.

FIG. 2 schematically illustrates a cargo compartment of a vehicle in the embodiment of the present disclosure, viewed from the right rear obliquely above. In FIG. 2, the left-right direction will be referred to as the "vehicle width direction," the left direction will be referred to as the "left side," "vehicle left side," or "one side in the vehicle width direction," and the right direction will be referred to as the "right side," "vehicle right side," or "the other side in the vehicle width direction". Further, the up-down direction in FIG. 2 will be referred to as the "height direction" or "vehicle height direction", the "upward direction" will be referred to as "upper side" or "vehicle upper side", and the "downward direction" will be referred to as "lower side" or "vehicle lower side". Further, a direction that is diagonally upward or diagonally downward with respect to the right direction in FIG. 2 will be referred to as the "front-rear direction" or "vehicle front-rear direction", the diagonally upward direction will be referred to as the "front side" or "vehicle front side", and the diagonally downward direction will be referred to as the "rear side" or "vehicle rear side".

Cargo handling system 100 is a system that supports a worker (a driver in a case where the worker is the driver) who unloads a cargo in the cargo compartment. Note that, vehicle 1 (see FIG. 2) is, for example, a delivery vehicle into which delivery items as cargos are loaded, or a freight car into which freight is loaded, but is not limited to these vehicles. Note that, as illustrated in FIG. 1, a radio frequency identification (RFID) into which predetermined information is written is attached to cargo LD. In the following description, an RFID may be referred to as an "RFID tag". In addition, an RFID tag may be simply referred to as an "RF tag" or an "IC tag".

As illustrated in FIG. 1, cargo handling system 100 includes RFID reader/writer 10, storage section 20, control apparatus 30, display apparatus 40, and second light source 50 (see FIG. 2).

(RFID Reader/Writer 10)

RFID reader/writer 10 includes a plurality of antennas 12, and transmits and receives a radio wave to and from an RFID tag attached to cargo LD through each of the plurality of antennas 12.

Each of the plurality of antennas 12 is disposed in cargo compartment 2. Inner wall 3 of cargo compartment 2 includes: one-side inner wall 3a that is located on one side in the vehicle width direction with respect to the central portion of cargo compartment 2; other-side inner wall 3b that is located on the other side in the vehicle width direction; front-side inner wall 3c that is located on the vehicle front side; and rear-side inner wall 3d that is located on the vehicle rear side. Note that, an entrance (not illustrated) that communicates between the inside and the outside of cargo compartment 2 is provided at rear-side inner wall 3d, and a door (not illustrated) for opening and closing the entrance is provided.

Antenna 12a is disposed at a vehicle-front side portion of one-side inner wall 3a. Antenna 12b is disposed at a vehicle-rear side portion of one-side inner wall 3a. Antenna 12c is disposed at the vehicle-front side portion of other-side inner wall 3b. Antenna 12d is disposed at the vehicle-rear side portion of other-side inner wall 3b. Note that, each of antennas 12a, 12b, 12c, and 12d is disposed in a position in the central portion of inner wall 3 in the up-down direction.

(Display Apparatus 40)

Display apparatus 40 includes a plurality of light-emitting diodes 40L (corresponding to "light sources" in the present disclosure) which is disposed corresponding to antenna 12a, 12b, 12c, and 12d, respectively. Light-emitting diode 40La is disposed corresponding to antenna 12a in the up-down direction, at an upper end portion of one-side inner wall 3a. Light-emitting diode 40Lb is disposed corresponding to antenna 12b in the up-down direction, at the upper end portion of one-side inner wall 3a. Light-emitting diode 40Lc is disposed corresponding to antenna 12c in the up-down direction, at an upper end portion of other-side inner wall 3b. Light-emitting diode 40Ld is disposed corresponding to antenna 12d in the up-down direction, at the upper end portion of other-side inner wall 3b.

Second light source 50 is disposed outside the cargo compartment and includes light-emitting diode 50L (corresponding to "the second light source" in the present disclosure). For example, light-emitting diode 50L may be disposed at an outer wall of the door for opening and closing the entrance of cargo compartment 2.

(Storage Section 20)

Storage section 20 is a storage apparatus such as a read only memory (ROM) that stores a basic input output system (BIOS) or the like that realizes control apparatus 30, a random access memory (RAM) that serves as a work area of control apparatus 30, an operating system (OS), an application program, various information that is referred to at the time of execution of the application program, and a hard disk drive (HDD) or a solid state drive (SSD) in which various maps are stored. Note that, control apparatus 30 is installed in a vehicle and is configured integrally with or separately from one or a plurality of other onboard electronic control unit(s) (ECU(s)) that control(s) equipment or a system(s) installed in the vehicle. Control apparatus 30 is connected to RFID reader/writer 10 through a communication line (for example, a wired line). On the other hand, control apparatus 30 may be installed outside the vehicle and may be connected to RFID reader/writer 10 via a communication network (for example, a wireless line).

Storage section 20 stores a list in which ID information of an RFID tag is associated with a delivery location. FIG. 3 is a diagram illustrating an example of the list. In the list illustrated in FIG. 3, for example, ID information AAAAAA is associated with delivery location XXX. Further, ID information BBBBBB is associated with delivery location YYY. Additionally, ID information CCCCCC is associated with delivery location ZZZ.

(Control Section 31)

Control section 31 is a processor such as the central processing unit (CPU) or the graphics processing unit (GPU) of control apparatus 30, and functions as acquisition section 32 and determination section 33 by executing a program stored in storage section 20. Note that, FIG. 1 illustrates an example in which control apparatus 30 is configured as a single apparatus. Control apparatus 30, however, may be realized by, for example, a plurality of processors, or a calculation resource such as a memory. In this case, each component that constitutes control section 31 is realized by at least one processor among the plurality of different processors executing a program.

Acquisition section 32 acquires ID information corresponding to a delivery location from storage section 20. Further, acquisition section 32 acquires the radio wave intensity (radio wave intensity signal) of an RFID tag having the acquired ID information from RFID reader/writer 10.

Figure 4:
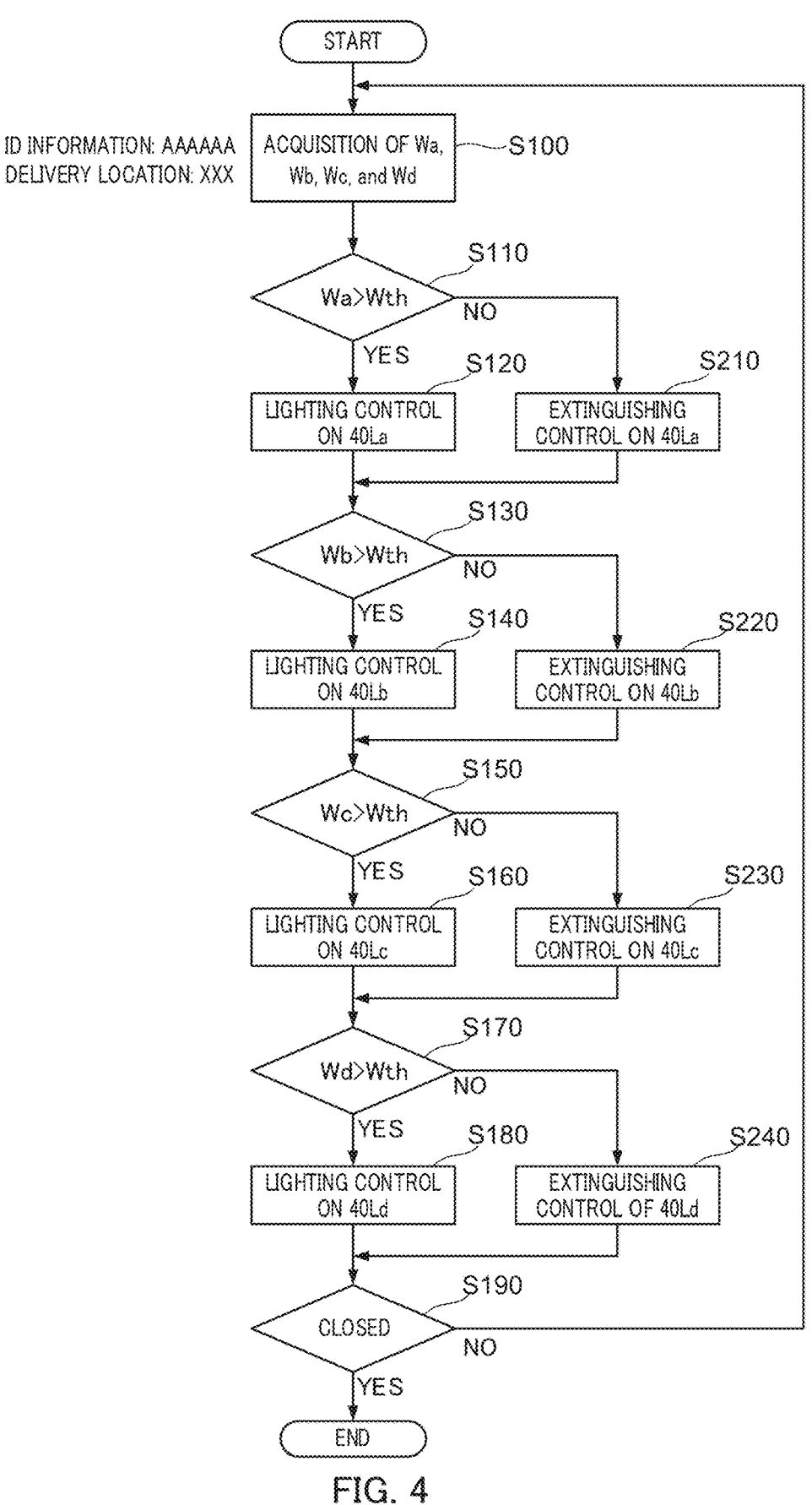
FIG. 4 is a flowchart illustrating exemplary operations of the cargo handling system in the embodiment of the present disclosure.

Specifically, in a case where vehicle 1 arrives at, for example, delivery location XXX, acquisition section 32 acquires ID information AAAAAA associated with delivery location XXX from storage section 20. Further, acquisition section 32 acquires the radio wave intensity of an RFID tag having ID information AAAAAA from RFID reader/writer 10. At this time, the radio wave intensity of the RFID tag acquired from RFID reader/writer 10 is the radio wave intensity of the radio wave of the RFID tag having ID information AAAAAA which is received by each of antennas 12a, 12b, 12c, and 12d. FIG. 4 illustrates radio wave intensity Wa of the radio wave of the RFID tag having ID information AAAAAA, which is received by antenna 12a, radio wave intensity Wb of the radio wave of the RFID tag having ID information AAAAAA, which is received by antenna 12b, radio wave intensity Wc of the radio wave of the RFID tag having ID information AAAAAA, which is received by antenna 12c, and radio wave intensity Wd of the radio wave of the RFID tag having ID information AAAAAA, which is received by antenna 12d.

Determination section 33 determines whether acquired radio wave intensities Wa, Wb, Wc, and Wd exceed threshold value Wth. Note that, threshold value Wth is predetermined through experimentation or simulation based on the size of cargo compartment 2, the radio wave intensity of the radio wave of an RFID tag attached to a cargo placed within cargo compartment 2, the performance of antennas 12, and the like. Further, threshold value Wth is a value that can be adjusted after the initial setting.

Control section 31 controls light-emitting diodes 40L based on the determination result of determination section 33. Specifically, in a case where the radio wave intensity exceeds the threshold value, control section 31 performs lighting control on light-emitting diodes 40L, and in a case where the radio wave intensity does not exceed the threshold value, control section 31 performs extinguishing control on light-emitting diodes 40L.

(Operation of Cargo Handling System 100)

Next, operations of the cargo handling system in the embodiment of the present disclosure will be described with reference to FIG. 4. FIG. 4 is a flowchart illustrating exemplary operations of the cargo handling system in the embodiment of the present disclosure. In the following description, a case where vehicle 1 has arrived at delivery location XXX will be described. Control section 31 determines whether vehicle 1 has arrived at the delivery location based on the position information of vehicle 1. The present flow starts in a case where vehicle 1 arrives at delivery location XXX and the entrance of cargo compartment 2 is opened.

First, in step S100, acquisition section 32 acquires ID information AAAAAA associated with delivery location XXX from storage section 20, and further acquires radio wave intensities Wa, Wb, Wc, and Wd of an RFID tag having ID information AAAAAA from RFID reader/writer 10.

Next, in step S110, determination section 33 determines whether radio wave intensity Wa exceeds threshold value Wth. In a case where radio wave intensity Wa exceeds threshold value Wth (step S110: YES), the processing transitions to step S120. In a case where radio wave intensity Wa does not exceed threshold value Wth (step S110: NO), the processing transitions to step S210.

In step S120, control section 31 performs lighting control on light-emitting diode 40La.

Next, in step S130, determination section 33 determines whether radio wave intensity Wb exceeds threshold value Wth. In a case where radio wave intensity Wb exceeds threshold value Wth (step S130: YES), the processing transitions to step S140. In a case where radio wave intensity Wb does not exceed threshold value Wth (step S130: NO), the processing transitions to step S220.

In step S140, control section 31 performs lighting control on light-emitting diode 40Lb.

Next, in step S150, determination section 33 determines whether radio wave intensity Wc exceeds threshold value Wth. In a case where radio wave intensity Wc exceeds threshold value Wth (step S150: YES), the processing transitions to step S160. In a case where radio wave intensity Wc does not exceed threshold value Wth (step S150: NO), the processing transitions to step S230.

In step S160, control section 31 performs lighting control on light-emitting diode 40Lc.

Next, in step S170, determination section 33 determines whether radio wave intensity Wd exceeds threshold value Wth. In a case where radio wave intensity Wd exceeds threshold value Wth (step S170: YES), the processing transitions to step S180. In a case where radio wave intensity Wd does not exceed threshold value Wth (step S170: NO), the processing transitions to step S240.

In step S180, control section 31 performs lighting control on light-emitting diode 40Ld.

Next, in step S190, control section 31 determines whether the entrance of cargo compartment 2 is closed. In a case where the entrance is closed (step S190: YES), the present flow is terminated. In a case where the door is not closed (step S190, NO), the processing is returned to step S100.

Figure 5:
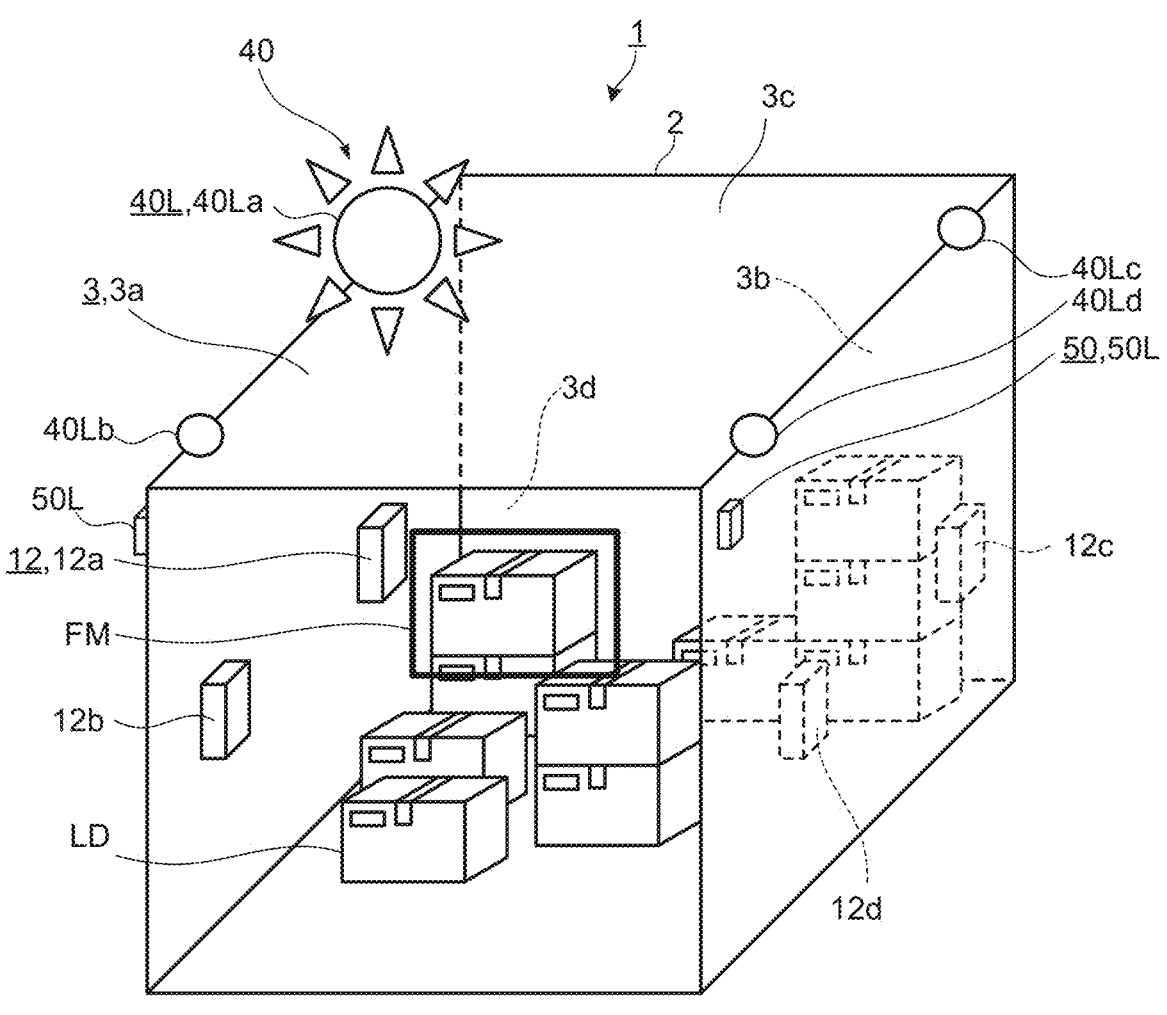
FIG. 5 illustrates a light-emitting diode or the like on which lighting control is performed.

An example of the operations of cargo handling system 100 has been described above. FIG. 5 illustrates a light-emitting diode or the like on which lighting control is performed. FIG. 5 illustrates light-emitting diode 40La on which lighting control is performed. The fact that light-emitting diode 40La is turned on indicates that the radio wave intensity of the radio wave of an RFID tag, which is received by antenna 12a disposed corresponding to light-emitting diode 40La, has exceeded the threshold value. In other words, it is indicated that the placement location for a cargo to be delivered (undelivered cargo) at a delivery location is a position near antenna 12a. Accordingly, by performing lighting control on light-emitting diode 40La, it is possible to guide the worker (driver) to the placement location for the cargo (here, the cargo surrounded by frame FM having a rectangular shape illustrated in FIG. 5), which is the position near antenna 12a. Thus, the worker can easily move the undelivered cargo to the outside of cargo compartment 2. When the undelivered cargo is moved to the outside of cargo compartment 2, the radio wave intensity of the radio wave of the RFID tag becomes equal to or less than the threshold value. In this case, control section 31 performs extinguishing control on light-emitting diode 40La. A case where one cargo undelivered at a delivery location is present has been described above.

Next, a case where a plurality of cargos undelivered at a delivery location is present will be described. Even in this case, when each of the plurality of undelivered cargos is moved the outside of cargo compartment 2, the radio wave intensities of the radio waves of the RFID tags attached to the respective cargos become equal to or less than the threshold value. Thus, control section 31 performs extinguishing control on light-emitting diodes 40L corresponding to the RFID tags, respectively. Further, by performing extinguishing control on each of all light-emitting diodes 40L, it is possible for the worker to easily visually recognize that there is no undelivered cargo left in the cargo compartment.

Next, a case where the radio wave intensities of the radio waves of RFID tags received by two or more antennas 12, respectively, exceed the threshold value will be described. In this case, lighting control is performed on light-emitting diodes 40L disposed corresponding to two or more antennas 12, respectively. However, even in this case, when an undelivered cargo(s) is/are moved to the outside of cargo compartment 2, the radio wave intensities of the radio waves of the RFID tags received by two or more antennas 12, respectively, become equal to or less than the threshold value. Thus, control section 31 performs extinguishing control on light-emitting diodes 40L corresponding to the RFID tags, respectively. Further, by performing extinguishing control on each of two or more light-emitting diodes 40L, it is possible for the worker to easily visually recognize that there has been one undelivered cargo and that there is no undelivered cargo left.

Cargo handling system 100 in the above-described embodiment supports, when unloading of a cargo loaded on vehicle 1 is performed, work of the unloading, includes: a plurality of antennas 12 disposed in cargo compartment 2; RFID reader/writer 10 that transmits and receives a radio wave to and from an RFID tag attached to the cargo through each of the plurality of antennas 12; storage section 20 that stores a list in which ID information of the RFID tag is associated with a delivery location; display apparatus 40 disposed in cargo compartment 2; and control apparatus 30 that acquires the ID information associated with the delivery location from storage section 20, further acquires the radio wave intensity of the RFID tag associated by the ID information from RFID reader/writer 10, and controls, in a case where the acquired radio wave intensity exceeds a threshold value, display apparatus 40 such that display apparatus 40 indicates a placement location for an undelivered cargo, which is a cargo to which the RFID tag is attached.

According to the above-described configuration, display apparatus 40 indicates the placement location for an undelivered cargo, thereby reducing the time required for the worker to find the undelivered cargo. Thus, since the worker can easily move the undelivered cargo to the outside of cargo compartment 2, it is possible to increase the efficiency of delivery work by reducing the burden on the worker.

Further, in cargo handling system 100 in the above embodiment, display apparatus 40 includes a plurality of light-emitting diodes 40L disposed corresponding to the plurality of antennas 12, respectively, and control apparatus 30 performs lighting control on one of the plurality of light-emitting diodes 40L, which is disposed corresponding to one of the plurality of antennas 12, which has received a radio wave with the radio wave intensity exceeding the threshold value from the RFID tag. Thus, the worker can easily visually recognize that a cargo whose placement location is a position near antenna 12 disposed corresponding to light-emitting diode 40L on which lighting control is performed is an undelivered cargo, and thus, it is possible to easily move the undelivered cargo to the outside of cargo compartment 2.

Note that, cargo handling system 100 of the above embodiment may further include light-emitting diode 50L disposed outside cargo compartment 2, and control apparatus 30 may perform lighting control on light-emitting diode 50L in a case where an undelivered cargo is present. Thus, when lighting control is performed on light-emitting diode 50L, the worker can easily visually recognize that an undelivered cargo is present in cargo compartment 2 from the outside of cargo compartment 2.

Note that, cargo handling system 100 in the above embodiment may further include light-emitting diode 50L disposed outside cargo compartment 2, and control apparatus 30 may perform lighting control on light-emitting diode 50L in a case where an undelivered cargo is present and the entrance of cargo compartment 2 is closed. Thus, when lighting control is performed on light-emitting diode 50L, the worker can easily visually recognize that an undelivered cargo is present in cargo compartment 2, and thus, it is possible for the worker to open the entrance and easily move the undelivered cargo to the outside of cargo compartment 2.

Further, cargo handling system 100 in the above embodiment is configured such that in a case where the radio wave intensities of the radio waves of RFID tags received by two or more antennas 12, respectively, exceed the threshold value, lighting control is performed on light-emitting diodes 40L disposed corresponding to two or more antennas 12, respectively, but the present disclosure is not limited thereto. It may be configured such that lighting control is performed on light-emitting diode 40L disposed corresponding to an antenna that has received the largest radio wave intensity of the radio wave of an RFID tag.

Further, cargo handling system 100 in the above embodiment is configured such that the light source is light-emitting diode(s) 40L and the second light source is light-emitting diode 50L, but the present disclosure is not limited thereto. For example, the light source and the second light source may be those of which lighting and extinguishing are visible to the worker (driver).

Any of the embodiment described above is only illustration of an exemplary embodiment for implementing the present disclosure, and the technical scope of the present disclosure shall not be construed limitedly thereby. That is, the present disclosure can be implemented in various forms without departing from the gist or the main features thereof.

The present disclosure is suitably utilized in a vehicle including a cargo handling system, which is required to increase the efficiency of delivery work by reducing the burden on a worker.

The invention claimed is:

1. A cargo handling system that supports, when unloading of a cargo loaded on a vehicle is performed, work of the unloading, the cargo handling system comprising:

an RFID reader/writer that includes a plurality of antennas disposed in a cargo compartment, and transmits and receives a radio wave to and from an RFID tag attached to the cargo through each of the plurality of antennas, the RFID tag being attached to the cargo;

a storage section that stores a list in which ID information of the RFID tag is associated with a delivery location;

a display apparatus disposed in the cargo compartment; and a control apparatus that acquires the ID information associated with the delivery location from the storage section, further acquires a radio wave intensity of the RFID tag from the RFID reader/writer, and controls, in a case where the radio wave intensity that has been acquired exceeds a threshold value, the display apparatus such that the display apparatus indicates a placement location for an undelivered cargo, the RFID tag having the ID information that has been acquired, the undelivered cargo being a cargo to which the RFID tag is attached, wherein the display apparatus comprises a plurality of light sources arranged in one-to-one correspondence with the plurality of antennas, and when the control apparatus controls the display apparatus to indicate the placement location of the undelivered cargo, the control apparatus:

(i) turns on the light source corresponding to any antenna that has received the radio wave whose intensity exceeds the threshold value; and (ii) turns off that light source when the intensity of the radio wave received by the corresponding antenna falls below the threshold value.

2. The cargo handling system according to claim 1, further comprising a second light source disposed outside the cargo compartment, wherein the control apparatus performs lighting control on the second light source in a case where the undelivered cargo is present.

3. The cargo handling system according to claim 1, further comprising a second light source disposed outside the cargo compartment, wherein the control apparatus performs lighting control on the second light source in a case where the undelivered cargo is present and an entrance of the cargo compartment is closed.

4. The cargo handling system according to claim 1, wherein the control apparatus determines whether the vehicle has arrived at the delivery location based on the vehicle's location information, and when the vehicle has arrived at the delivery location and the entrance to the luggage compartment has been opened, acquires the ID information associated with the delivery location from the storage section, further acquires the radio wave intensity of the RFID tag from the RFID reader/writer, and controls, in a case where the radio wave intensity that has been acquired exceeds the threshold value, the display apparatus such that the display apparatus indicates the placement location for the undelivered cargo, wherein, after controlling the display apparatus, the control apparatus determines whether the entrance to the luggage compartment is closed; if the entrance is closed the control apparatus terminates the control; whereas if the entrance is not closed, the control apparatus again acquires the ID information associated with the delivery location from the storage section, further acquires the radio wave intensity of the RFID tag from the RFID reader/writer, and controls, in a case where the radio wave intensity that has been acquired exceeds the threshold value, the display apparatus such that the display apparatus indicates the placement location for the undelivered cargo.

5. The cargo handling system according to claim 1, wherein the plurality of antennas are arranged at least at four locations—front, rear, left, and right—relative to a center of the luggage compartment, and the plurality of light sources are arranged at an upper end of an inner wall above the corresponding antennas so as to correspond one-to-one with the plurality of antennas.

6. A control method for operating a cargo handling system that supports, when unloading of a cargo loaded on a vehicle is performed, work of the unloading, wherein the cargo handling system comprising:

an RFID reader/writer that includes a plurality of antennas disposed in a cargo compartment, and transmits and receives a radio wave to and from an RFID tag attached to the cargo through each of the plurality of antennas, the RFID tag being attached to the cargo;

a storage section that stores a list in which ID information of the RFID tag is associated with a delivery location;

a display apparatus disposed in the cargo compartment, and including a plurality of light sources arranged in one-to-one correspondence with the plurality of antennas; and a control apparatus, wherein the control apparatus acquires the ID information associated with the delivery location from the storage section, further acquires a radio wave intensity of the RFID tag from the RFID reader/writer, and controls, in a case where the radio wave intensity that has been acquired exceeds a threshold value, the display apparatus such that the display apparatus indicates a placement location for an undelivered cargo, the RFID tag having the ID information that has been acquired, the undelivered cargo being a cargo to which the RFID tag is attached, and wherein, when the control apparatus controls the display apparatus to indicate the placement location of the undelivered cargo, the control apparatus:

(i) turns on the light source corresponding to any antenna that has received the radio wave whose intensity exceeds the threshold value; and (ii) turns off that light source when the intensity of the radio wave received by the corresponding antenna falls below the threshold value.

7. A non-transitory computer-readable recording medium storing a control program for operating a cargo handling system that supports, when unloading of a cargo loaded on a vehicle is performed, work of the unloading, wherein the cargo handling system comprising:

an RFID reader/writer that includes a plurality of antennas disposed in a cargo compartment, and transmits and receives a radio wave to and from an RFID tag attached to the cargo through each of the plurality of antennas, the RFID tag being attached to the cargo;

a storage section that stores a list in which ID information of the RFID tag is associated with a delivery location; and a display apparatus disposed in the cargo compartment, and including a plurality of light sources arranged in one-to-one correspondence with the plurality of antennas;

wherein the control program acquires the ID information associated with the delivery location from the storage section, further acquires a radio wave intensity of the RFID tag from the RFID reader/writer, and controls, in a case where the radio wave intensity that has been acquired exceeds a threshold value, the display apparatus such that the display apparatus indicates a placement location for an undelivered cargo, the RFID tag having the ID information that has been acquired, the undelivered cargo being a cargo to which the RFID tag is attached, wherein, when the control program controls the display apparatus to indicate the placement location of the undelivered cargo, the control program:

(i) turns on the light source corresponding to any antenna that has received the radio wave whose intensity exceeds the threshold value; and (ii) turns off that light source when the intensity of the radio wave received by the corresponding antenna falls below the threshold value.

* * * * *